Figure 1:
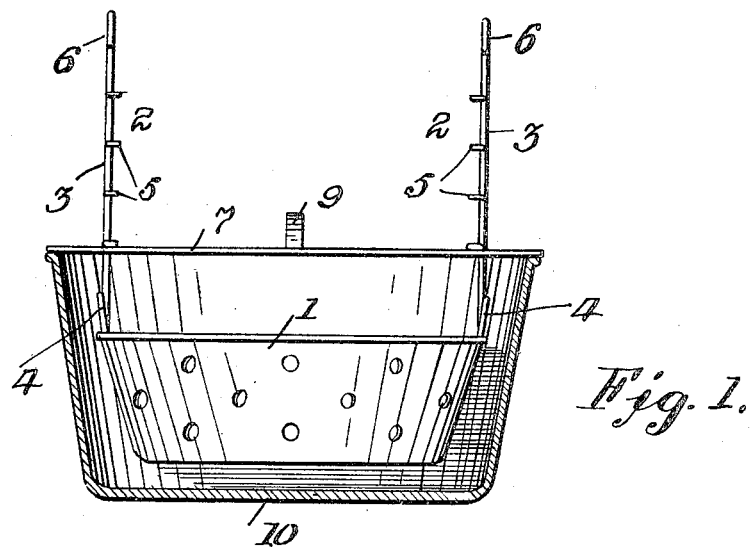

No. 812,564. PATENTED FEB. 13, 1906.
W. G. HENDERSON & J. W. WEISS.
COOKER.
APPLICATION FILED JULY 3, 1905.

Witnesses
Inventors
W. G. Henderson & J. W. Weiss.
By their Attorneys

UNITED STATES PATENT OFFICE.

WILLIAM G. HENDERSON AND JOSEPH W. WEISS, OF OIL CITY, PENNSYLVANIA.

COOKER.

No. 812,564.

Specification of Letters Patent.

Patented Feb. 13, 1906.

Application filed July 3, 1905. Serial No. 268,200.

*To all whom it may concern:*

Be it known that we, WILLIAM G. HENDERSON and JOSEPH W. WEISS, citizens of the United States of America, residing at Oil City, in the county of Venango and State of Pennsylvania, have invented certain new and useful Improvements in Cookers, of which the following is a specification, reference being had therein to the accompanying drawings.

This invention relates to certain new and useful improvements in culinary vessels; and the invention relates more particularly to a cooking utensil adapted to be used in connection with a suitable vessel.

The primary object of this invention is to provide a novel cooking utensil adapted to be used for boiling vegetables, such as potatoes, and the utensil is so constructed as to prevent vegetables from burning by the boiling water becoming evaporated. To this end we have devised a cooking utensil adapted to be used in connection with a vessel containing boiling water, and we have provided novel means for suspending and temporarily holding our improved cooking utensil within said vessel while vegetables contained within the utensil are being boiled or cooked by the water contained within the vessel.

Briefly described, our improved cooking utensil consists of a perforated receptacle provided with upwardly-extending handles having cross-ribs or outlying prongs, the handles being adapted to pass through open-ended slots in the edge of a lid placed upon a suitable vessel containing boiling water, the prongs or ribs bearing on the top of the lid adjacent the slots and serving to support the perforated receptacle within the vessel.

The above construction will be hereinafter more fully described and then specifically pointed out in the claims, and, referring to the drawings accompanying this application, like numerals of reference designate corresponding parts throughout the several views, in which—

Figure 2:
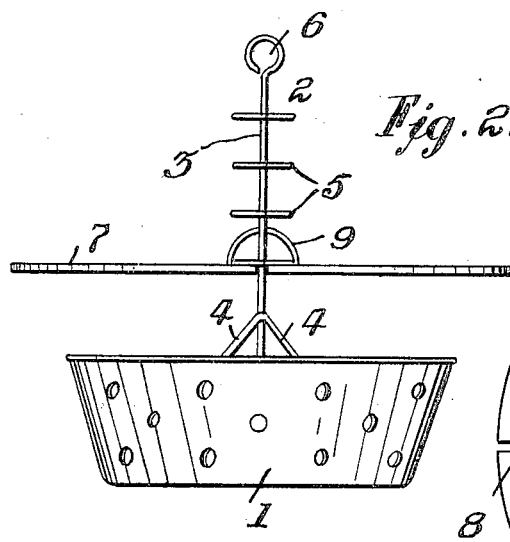
Figure 3:
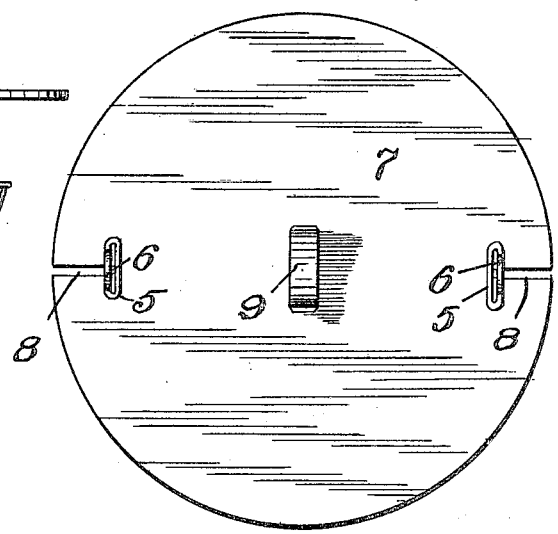

Figure 1 is a vertical sectional view of a vessel equipped with our improved cooking utensil. Fig. 2 is a side elevation of the cooking utensil, and Fig. 3 is a top plan view of the same.

To put our invention into practice, we employ a perforated receptacle 1, having upwardly-extending diametrically-opposed handles 2 2. Each handle consists of a rod 3, which is preferably constructed of a strong and durable wire or the like material. The rods 3 are braced adjacent to the receptacle 1 by wires 4 4, which are secured to the rods 3 and the top edge of the receptacle 1 by solder or the like fastening means. The rods 3 are bent to provide a plurality of outwardly-extending prongs or ribs 5, the prongs or ribs upon one side of the rods 3 lying diametrically opposite the prongs or ribs upon the opposite side. The upper ends of the rods 3 are bent to form eyelets 6, which serve to facilitate manipulation of our improved cooking utensil, as will be presently described.

Between the handles 2 2 we mount a lid or cover 7, said lid or cover being of a greater diameter than the receptacle 1. The periphery of the lid is provided with two diametrically-opposed slots 8 8, and in these slots are adapted to engage the rods 3 3 of the handles. Centrally of the lid we provide a suitable semicircular handle 9 in order that the cooking utensil can be readily carried by a person.

The cooking utensil is adapted to be used in connection with a vessel 10, upon which the lid 7 is adapted to fit. As heretofore stated, the cooking utensil is preferably used for boiling potatoes and other vegetables, and as a matter of convenience we will assume that potatoes are to be boiled within the receptacle 1. The vessel 10 having been filled with water and placed upon a fire to boil the water, the cooking utensil is set down into the vessel 10, as illustrated in Fig. 1 of the drawings. The receptacle 1 containing the potatoes is supported above the bottom of the vessel 10, but submerged in the water contained within the vessel. To support the cooking utensil in a suspended position within the vessel, the lid 7 and the handles 2 2 have been provided. In placing the lid 7 upon the handles 2 2, so that the cooking utensil will be suspended within the vessel, the handles 2 2 are moved outwardly, which permits of the lid being elevated to a desired height upon the handles, the ribs or prongs 5 supporting the lid at any desired height within the scope of the handles of the receptacle. When the lid 7 is placed upon the vessel, the ribs or prongs 5 are adapted to rest on each side of the slots 8, and it will be impossible for the receptacle 1 to further descend within the vessel 10 while the lid 7 is upon said vessel.

Should the water contained within the vessel 10 become evaporated and the vessel become dry, it will be impossible for the vegetables and potatoes contained within the receptacle 1 to burn on account of the fire not contacting with the bottom of the receptacle 1. Should, however, the heat be sufficient to cause the bottom of the receptacle 1 to become hot enough to burn the vegetables contained therein, a sufficient quantity of water is retained within the receptacle 1, owing to the perforations being slightly above the bottom of said receptacle, and this water will remain sufficiently cool to prevent the heat given off from the bottom of the vessel 10 from burning the vegetables contained within the receptacle 1.

We do not care to confine ourselves to the type of vessel in connection with which our improved cooking utensil is used, as the same is applicable to boilers wherein clothes are boiled.

It is thought from the foregoing that the construction, operation, and advantages of the herein-described cooking utensil will be apparent without further description, and various changes in the form, proportion, and minor details of construction may be resorted to without departing from the spirit of the invention or sacrificing any of the advantages thereof.

What we claim, and desire to secure by Letters Patent, is—

1. In a cooking utensil of the character described, the combination with a vessel, of a lid adapted to fit upon said vessel, said lid having diametrically-opposed open-ended slots formed therein, a handle carried by said lid, a perforated receptacle adapted to be supported within said vessel, upwardly-extending rods carried by said receptacle, prongs carried by said rods and adapted to engage upon the sides of said slots, substantially as described.

2. The combination with a suitable vessel, of a lid adapted to fit upon said vessel, said lid having open-ended slots formed therein, a perforated receptacle adapted to be suspended within said vessel, two vertically-disposed resilient handles, one connected to said receptacle at each side thereof, said handles being formed each with a plurality of integral laterally-extending prongs engaging the lid of the vessel to adjustably suspend said receptacle within said vessel, substantially as described.

In testimony whereof we affix our signatures in the presence of two witnesses.

WILLIAM G. HENDERSON.
JOSEPH W. WEISS.

Witnesses:
A. R. KNAPP,
CHAS. TAYLOR.